Oct. 10, 1950 — R. L. KIMBLE — 2,525,099
ADJUSTING MEANS FOR SHUTTER OPERATING MECHANISMS
Filed Oct. 26, 1946

INVENTOR.
ROGER L. KIMBLE
ATTORNEYS

Patented Oct. 10, 1950

2,525,099

UNITED STATES PATENT OFFICE 2,525,099

ADJUSTING MEANS FOR SHUTTER OPERATING MECHANISMS

Roger L. Kimble, Binghamton, N. Y., assignor to General Aniline & Film Corporation, New York, N. Y., a corporation of Delaware Application October 26, 1946, Serial No. 705,882

3 Claims. (Cl. 95—63)

1

This invention pertains to a photographic shutter, and, more especially, to a linkage for interconnecting and for actuating the shutter blades and by means of which adjustments may be effected and all slack or lost motion taken up.

In shutters having blade interconnecting linkage, as illustrated in United States Patent No. 1,626,032, the several blades must be opened and closed in synchronism, that is, so that they arrive at the fully opened and at the fully closed positions in unison. The linkage for accomplishing this comprises cranks or similar operating arms attached to the blades adjacent their pivots and a plurality of links, one for each blade, interconnecting the cranks. One of the cranks or other blade connections serves as a master crank to receive motion from some suitable power mechanism.

When assembled, it is desirable that each of the blades, cranks and links function as freely as possible and that there be no lost motion such as might occur if there were a slight amount of slack at any one of the interconnecting pivots either for the links or for the blades. Even though the mechanism could be made so that all dimensions were perfectly accurate at the start, a slight amount of wear after continued use would give rise to some lost motion, that being undesirable since it would affect proper functioning of the elements and since lost motion gives rise to rapid destruction of the parts as they are subjected to shock loads under extremely fast action.

For production reasons, it is most desirable that tolerances be maintained as liberal as practicable. To that end, the instant invention applies to an adjustment at the blade pivots by means of which all lost motion may be taken up and by means of which the blade action may be properly synchronized while being assured that the various pivots work freely thereby reducing friction to a minimum.

The invention will be described by reference to the accompanying figures of drawing, wherein.

Figure 1:
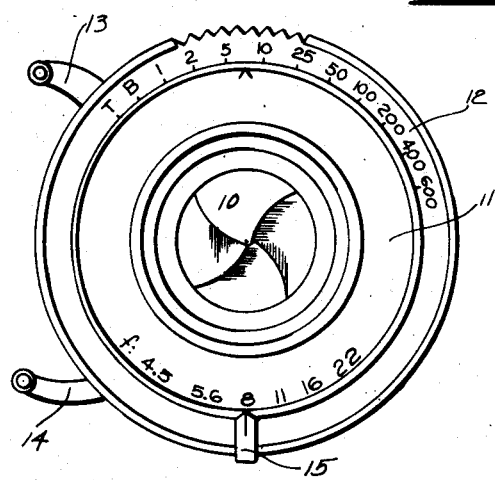
Fig. 1 is a plan view showing a shutter of the general type to which the invention may be applied.

Referring to Fig. 1, a shutter having a plurality of blades 10 and normally referred to as a between-the-lens type shutter, also has a front plate or casing member 11 having thereon the graduations for the stops and a rotatable speed ring 12 graduated in the usual manner for setting the various shutter speeds. A setting or priming lever 13 is of conventional design as is the trigger 14. The pointer 15 serves in conjunction with the stop graduations to set the diaphragm at any desired aperture.

Figure 2:
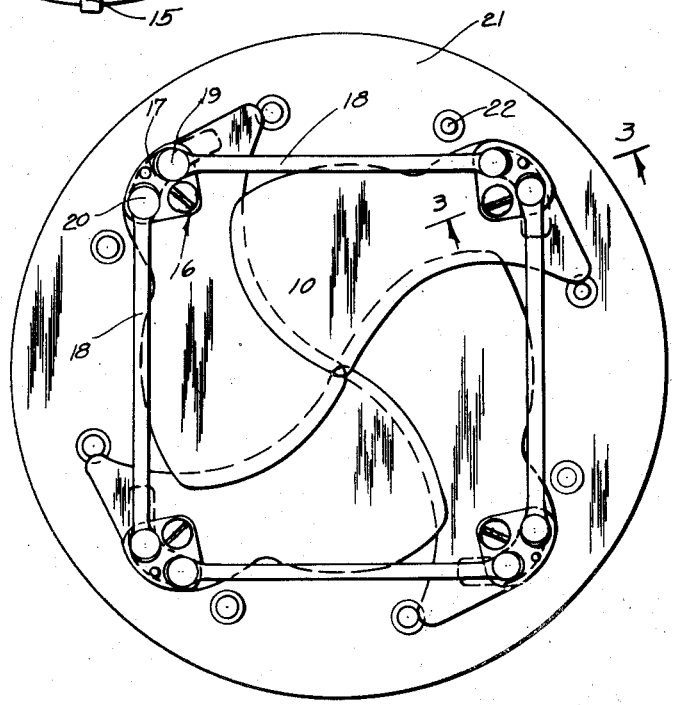
Fig. 2 is a detail of part of the shutter including the blades, blade mounting plate, pivots, cranks, and interconnecting links.

Now referring to Fig. 2, each of the shutter blades 10, of which there are four in number, is pivoted at a pivot point generally indicated by numeral 16. While four shutter blades have been illustrated here, it is to be understood that three or more may be employed. Each of the blades has attached thereto a plate 17 which actually serves as a crank arm or arms to which links 18 are pivoted, one at 19 and the other at 20. Plates 17, links and pivots 19 and 20 are to be found, one for each blade, and serve to interconnect and to open and close the blades in a manner obvious from Fig. 2 and heretofore known, see the patent above cited.

Plate 17 may be attached to the blade 10 by riveting, by spot-welding, by a thermo-setting metal adhesive, or in any other satisfactory manner as by a clamping mechanism. The pivots 16 extend into appropriate holes drilled in a blade carrying ring or support 21. This support 21 is mounted within the shutter casing and is secured in place by attaching screws which pass through suitable holes 22.

Figure 3:
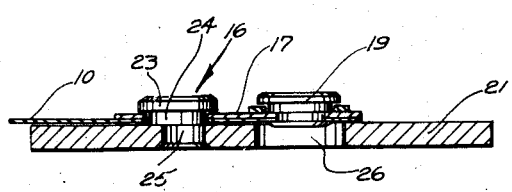
Fig. 3 is a section taken at line 3—3, Fig. 2.

Now referring to Fig. 3, the details of one blade and its associated mechanism have been shown to a scale greatly enlarged. The blade itself is shown overlying the plate or support 21 and having the plate 17 attached thereto. The pivot generally indicated by numeral 16 comprises a head portion 23, an eccentric part 24 about which both the blade and plate 17 pivot freely. The pivot 16 then continues in a portion 25 of lesser diameter and passes through the plate 21 to be riveted or headed over after suitable adjustments have been made. It is to be understood that the eccentric portion 24 also serves as a shoulder so that the riveting operation may be performed without drawing the head 23 down to an extent to bind the blade and plate against the support 21. Slight working clearances are provided and after the parts have been assembled and all links connected, the adjustment is effected by turning the pivots 16 which at that time are headed only enough to hold them in position, but to allow enough freedom of rotation so that the final setting may be accomplished. After all of the pivots 16 have been finally adjusted so that the blades open and close in proper synchronism and so that there is neither any appreciable lost motion between the links and their pivots nor undue friction, a final riveting secures all parts in finally adjusted position. It is to be understood that the head 23, although preferably concentric with portion 24, may be concentric with the part 25 depending upon the method of manufacture. While the invention is not to be specifically limited by dimensions, it has been found that an eccentricity of .003" is sufficient for adjustment of a shutter for covering a 1" aperture.

The link pivots 19 and 20 comprise shoulder rivets which serve both as connecting means for the links, and, if desired, to hold the plate 17 in suitable attachment with the blade itself. An arcuate slot 26, one for each of the blades, serves to permit the head of the rivet 19 to move freely even though the blade itself is practically in contact with the face of supporting plate 21 and the rivet head projects beyond it. The eccentric pivots are slotted for the reception of a screw driver and the slot preferably runs in the direction of eccentricity so that it may be observed.

If adjustments are to be effected after prolonged use and wear, the pivots 16 may be slightly loosened and after lost motion is taken up, may again be headed over to lock the adjustment.

While one embodiment of the invention has been disclosed, it is to be understood that the inventive concept may be carried out in a number of ways. This application is, therefore, not to be limited to the precise details described, but is intended to cover all variations and modifications thereof falling within the spirit of the invention and the scope of the claims.

I claim:

1. In a photographic shutter, the combination of a blade supporting member, a plurality of blades, pivot means for each blade affixed to said member about which it may be swung to and from open and closed positions, interconnecting links pivoted to adjacent blades at a point removed from the blade pivot and movable for controlling the relative position of the blades, said pivot means comprising eccentric means rotatable for adjusting the relative positions of the blades and for taking up lost motion between the links and their connecting pivots.

2. In a photographic shutter, the combination of a blade supporting member, a plurality of blades, pivot means for each blade about which it may be swung to and from open and closed positions, crank means attached to each blade and interconnecting links pivoted to said crank means at a point removed from the blade pivot and movable for controlling the relative position of the blades, said pivot means comprising a rivet located in said member about which each blade may be swung, said rivet having an eccentric portion so that when the rivet is bodily rotated, the point about which the blade is pivoted may be varied until the blades are properly positioned and lost motion is taken up at the links and their connecting pivots.

3. In a photographic shutter, the combination of a blade supporting member, a plurality of blades, pivot means for each blade about which it may be swung to and from open and closed positions, plates attached to each blade extending from the blade pivot outwardly to form crank arms at which are pivoted interconnecting links, one for each blade and by means of which the relative position of said blades may be controlled, said pivot means comprising rivets extending to be locked in said supporting member and having shouldered eccentric portions about which a blade and its attached plate may be swung to and from open and closed positions, a slot for adjusting the position of said eccentric rivets before they are locked in said support thereby to center the blades and take up lost motion between the links and their connecting pivots.

ROGER L. KIMBLE.

REFERENCES CITED

The following references are of record in the file of this patent:

UNITED STATES PATENTS

| Number | Name | Date |
| --- | --- | --- |
| 1,626,032 | Fairchild | Apr. 26, 1927 |
| 2,376,982 | Schwartz et al. | May 29, 1945 |
| 2,413,017 | Wilcox | Dec. 24, 1946 |